UNITED STATES PATENT OFFICE.

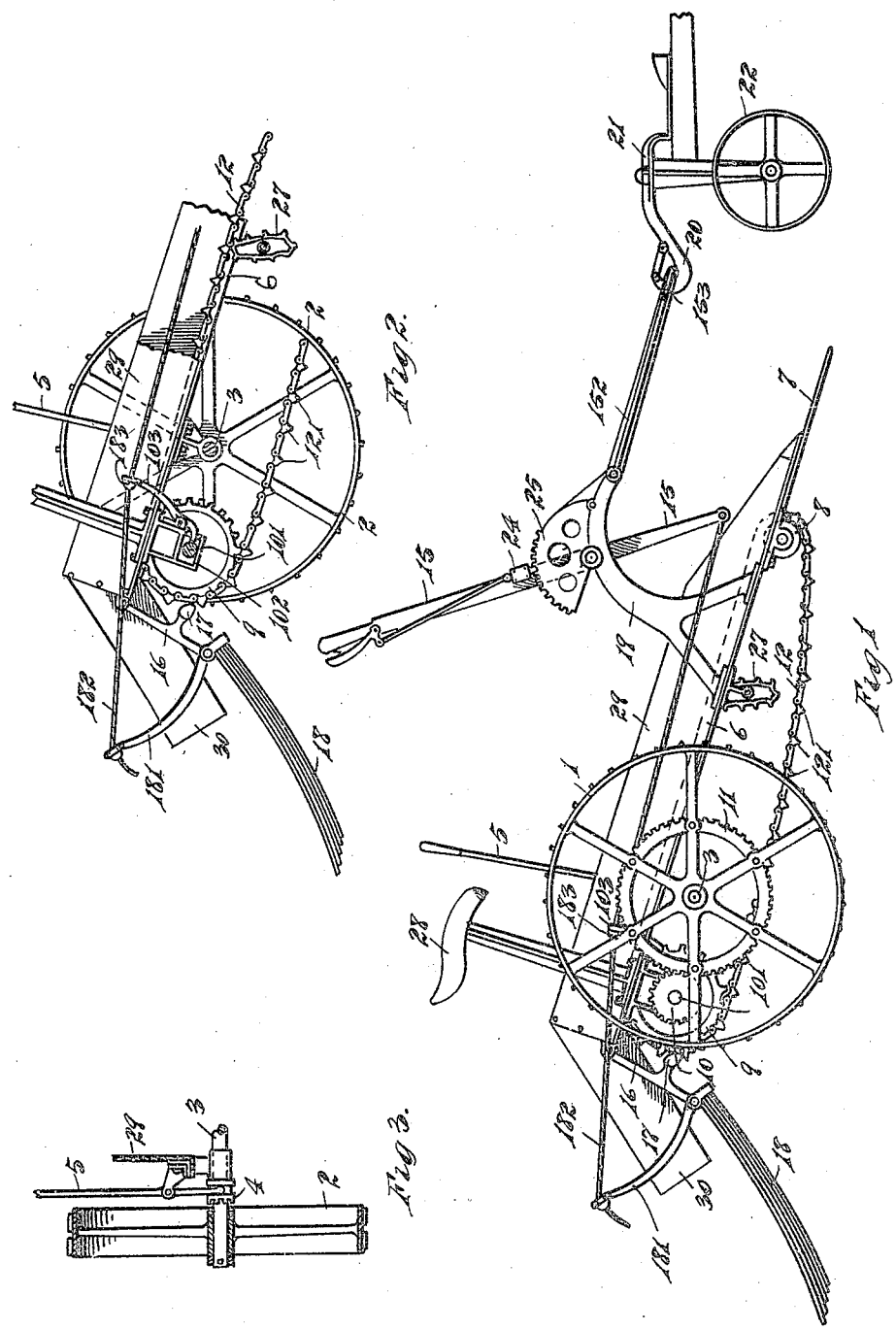

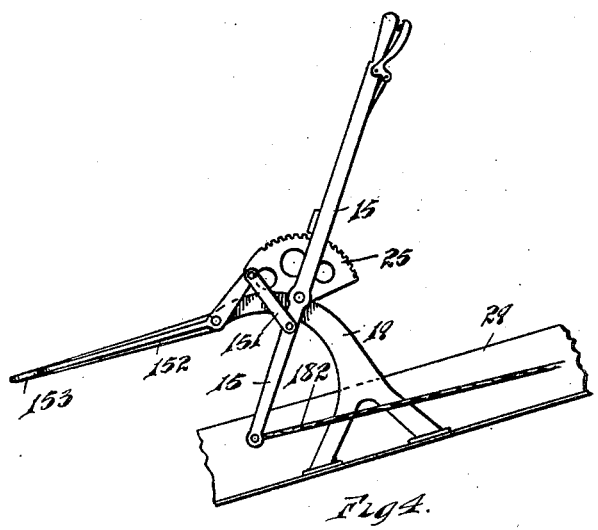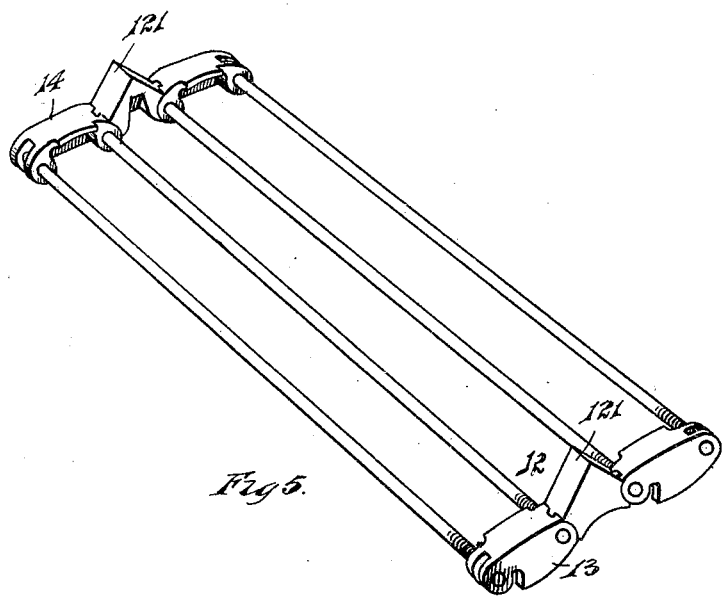

JOSEPH F. SHEFFERLY, OF HOWLETT, MICHIGAN, ASSIGNOR TO HIMSELF, CHARLES W. NORTON, AND EDWIN HENDERSON, OF DETROIT, MICHIGAN.

POTATO-DIGGER.

No. 808,615.　　Specification of Letters Patent.　　Patented Dec. 26, 1905.

Application filed May 25, 1905. Serial No. 262,130.

*To all whom it may concern:*

Be it known that I, JOSEPH F. SHEFFERLY, a citizen of the United States, residing at Howlett, county of Wayne, State of Michigan, have invented a certain new and useful Improvement in Potato-Diggers; and I declare the following to be a full, clear, and exact description of the invention, such as will enable others skilled in the art to which it pertains to make and use the same, reference being had to the accompanying drawings, which form a part of this specification.

This invention relates to potato-diggers.

It has for its object improvements in wheeled potato-diggers.

In the drawings, Figure 1 is a side elevation. Fig. 2 is a longitudinal section through the rear part of the machine. Fig. 3 is a detail of the clutch mechanism between the axle and the running-wheel. Fig. 4 is a detail of the adjusting-lever at the front end of the digging part of the machine. Fig. 5 is a detail of a part of the carrier-chain.

The main part of the machine is mounted on carrying-wheels 1 and 2 on an axle 3. The carrying-wheels also serve as driving-wheels. The wheel 1 is permanently keyed to the axle. The wheel 2 is loose on the axle, but is normally clutched thereto by a shifting clutch 4, actuated by a hand-lever 5. The clutch is released when it is desired to turn the digger, and it is therefore necessary that one wheel should turn independently of the other.

On the axle is mounted a frame or platform 6, which terminates at its forward end with a shovel-plow blade 7 and carries a pair of sprocket-wheels 8 at the front end and a driving sprocket-wheel 9, journaled on cross-bars, at the rear end. The driving sprocket-wheel 9 is driven by a pinion 10, that meshes with the master-wheel 11. The master-wheel 11 is bolted to the driving-wheel 1 and is driven by the shaft of the driving-wheels 1 and 2. A traveling grid-conveyer 12, provided with sprocket-chains 13 and 14, travels around the driving sprocket-wheel 9 and the sprocket-wheel 8. The sprocket-wheel 9 and its shaft are movable to spread the distance between the axle 3 and the shaft 101 and throw the master-wheel 11 and the pinion 10 into and out of engagement. To this end the shaft 101 rests in boxes which can slide in bearings 102. Normally the boxes are drawn by the tension of the sprocket-chain and by gravity to bring the wheels 10 and 11 into mesh; but they may be thrown out of mesh by the lever 103, actuated by hand-lever 15, as will be hereinafter explained. At the rear of the frame which carries the conveyer are hung arms 16, provided with fingers 17, that engage the sprocket-chain 12 and ride over high links 121 of the sprocket-chain. These give to the arm 16 a vibratory or reciprocatory motion, which is communicated to a number of fingers 18, pivoted to the lower end of the arm 16. The bar which carries the fingers 18 is provided with an arm 181, the end of which is connected to a cable 182. This cable reaches to the lower end of the hand-lever 15, engaging in the course of its length with the lever 103, which engages with the cable 182 by means of an adjustable button 183. The hand-lever 15 is pivoted on brackets 19, that rise from the frame 6, and it has pivoted to it a compound lever consisting of a link 151 and a bent lever 152, which bent lever is pivoted to the end of the bracket 19. The forward end of the bent lever 152 is provided with an eye 153, which engages over a mousing-hook 20, that forms the rear terminal of a cross-bar 21, swiveled above a caster-wheel 22. The forward end of the bar 21 is provided with and supports the draft appliance by which the vehicle is drawn.

The hand-lever 15 is provided with a latch 24, that engages a toothed quadrant 25, mounted on the bracket 19 on the main frame 6. If the hand-lever 15 be swung backward from the position shown in Fig. 1, the front end of the machine drops to its digging position, the shaft 101 is free to move forward to bring the wheels 10 and 11 into mesh, and the free end of the fingers 18 drop downward to their position for delivering potatoes received from the sprocket-chain. The sprocket-chain revolves under the motive force of the driving-wheels. If the reverse motion be given to the hand-lever 15, the front end of the digging-shovel 7 is lifted, the chain-driving mechanism is drawn out of gear, and the free ends of the fingers 18 are lifted and the machine is in condition for transportation without communication movement from the driving-wheels to the sifting and elevating movement of the carrier.

To increase the vibration of the carrier, the chains runs over an eccentric wheel 27, which is mounted on a hanging bracket from the frame 6, and this gives to the sprocket-chains and to the grid carried by them a shaking movement which aids in breaking up the pieces or lumps of dirt that may have been carried up with the potatoes or dirt which may have adhered to the potatoes.

The vehicle is provided with a driver's seat 28 on a bracket-arm that rises from the frame 6. The front part of the frame is provided with side guards 29 and with a rear part of the side guards 30.

What I claim is—

1. In a potato-digger, in combination with a frame provided with driving-wheels, and a forward portion in the form of a shovel, a gear-wheel carried on one of said driving-wheels, a sprocket-wheel carrying a gear-wheel adapted to mesh with said first-named gear-wheel, a second sprocket-wheel axially in alinement with the first, a sprocket-chain carrying a grid and engaging over said sprocket-wheels, fingers depending from the rear of said frame adapted to be vibrated by engagement with said sprocket-chain, and means whereby said fingers may be moved out of such engaging position, substantially as described.

2. In a potato-digger, in combination with driving-wheels, and an axle therefor, a frame carrying a shovel on its forward portion, a plurality of sprocket-wheels carried by said frame, means whereby the motion of the driving-wheels may be imparted to said sprocket-wheels, a chain carrying a grid engaging over said sprocket-wheels, and a plurality of vibrative fingers depending from the rear of said frame normally engaging against said sprocket-chain, and adapted to be moved from such position of engagement without stoppage of the remaining portion of the mechanism, substantially as described.

3. In a potato-digger, in combination with driving-wheels, and an axle therefor, a frame terminating at its front end with a shovel, sprocket-wheels carried by said frame, a sprocket-chain carrying a grid engaging thereover, said chain being arranged to be actuated by said driving-wheels, fingers depending from the rear of said frame adapted to be vibrated by said sprocket-chain, and means whereby said fingers may be lifted from engagement against said sprocket-chain, substantially as described.

4. In a potato-digger, in combination with driving-wheels, a frame terminating at its front end with a shovel, a grid-carrier mounted upon said frame and arranged to be actuated by said driving-wheels, hanging fingers at the rear of said frame, arranged to be vibrated by said grid-carrier, and means whereby said fingers may be moved from vibrative position and said shovel end simultaneously raised from engagement with the ground, substantially as described.

In testimony whereof I sign this specification in the presence of two witnesses.

JOSEPH F. SHEFFERLY.

Witnesses:
CHARLES F. BURTON,
MAY E. KOTT.